106-75

Patented Nov. 11, 1947

2,430,483

UNITED STATES PATENT OFFICE 2,430,483

PROCESS OF PRODUCING AN INTUMESCED COMPOSITION OF MATTER

Hugh M. Spencer, Buffalo, N. Y., assignor to Stanley D. Libbey, Washington, D. C.

No Drawing. Application September 20, 1945, Serial No. 617,663

2 Claims. (Cl. 154—88)

My present invention relates to the production of an intumesced composition of matter comprised in part of a mixture of a particular filler material and silicate of soda useful, for instance, in the making of wall board or the like, and similar processes and it has for its general object to provide an improved composition of this kind through producing a controlled and desirable viscosity with respect to the silicate of soda component in the making of such porous compositions by so intumescing such mixtures between sheet-form liners themselves confined between spaced hot plates.

A purely mechanical method that may be employed in conjunction with my process as hereinafter described is disclosed, for instance, in the patent to H. F. Weiss, et al., No. 1,655,718, dated January 10, 1928. There are other methods, however, that differ from this in that the manufacture of the wall board is made a continuous or progressive operation wherein two sheet-form liners travel between upper and lower heated, intumescing plates after the limestone and sodium silicate mix has been fed between the liners, pull rolls being utilized to impart the continuous movement. In some respects, my process is more useful than the latter method for reasons that will appear.

In carrying out said intumescing process, I have found that, in general, the more viscous that the silicate of soda solution is which is present in the mix before intumescence, the finer grained and the more uniform is the porous product after said intumescing. It has not hitherto been possible to economically produce, nor even to produce at all, commercial solutions of silicate of soda which possess that exceedingly great viscosity which engenders a high degree of fineness and uniformity and water resistance in the pore structure of intumesced compositions of matter. The present invention, however, permits of the attainment of very high viscosities in the sodium silicate solutions.

Under the present invention, I am able to use aqueous solutions of silicate of soda possessing practicably-producible and technically-feasible viscosities in connection with making intumesced compositions of matter. More specifically, I have found that, by incorporating into the mix of particulate filler materials and aqueous sodium silicate solutions, certain water soluble salts or electrolytes in the solid state which are compatible with silicate of soda, and then by mixing and dissolving said solid salts into said sodium silicate solutions present in said mix, it is possible to produce from such final mix intumesced compositions of matter which possess a finer and a more uniform porosity in their structure than has heretofore been possible of accomplishment. Furthermore, said intumesced compositions of matter are more water resistant when the above mentioned solid salts are used in the mix, from which said intumesced compositions of matter are made, than when said salts are absent from said mix.

In carrying out the present invention, I mix aqueous solutions of silicate of soda with a particulate filler material, said filler material being either non-reactive with silicate of soda, or only very slowly reactive at ordinary temperatures, and include in said mix a relatively small quantity of a water soluble salt or electrolyte in solid form which is compatible with silicate of soda. During and after the mixing of the just-mentioned ingredients, there is engendered a progressive increase in the viscosity of the mix. For example, if I use a mixture of aqueous sodium silicate solution and ground limestone, said sodium silicate solution having a low viscosity such as exists in a sodium silicate solution having a specific gravity of 1.45 at 20° C. and a ratio of the contained silicon dioxide and sodium oxide of 3 to 2, such mix will be thin and watery like liquid mud. However, if there is added to this just described mix and dissolved therein a small amount of dry crystalline or powdered salt, then and in that event the viscosity of the said watery mix steadily increases, either by continued mixing or, if the mix stands quietly, until the said mix becomes stiffer than the stiffest kind of common putty. This condition of extreme stiffness, however, should not be attained in the mix until after it has been run between the liners, for the reason that it becomes unworkable in both the mixer and the rolls.

As an example of the present invention as produced under the aforesaid method, I may take 170 parts by weight of a thin, commonly produced aqueous silicate of soda solution having a specific gravity of 1.45 at 20° C. and a ratio existing between the contained silicon dioxide and the sodium oxide contained therein of 3 to 2, and put the said silicate of soda solution into a mixer. I then add thereto 300 parts by weight of standard ground limestone of ordinary agricultural fineness, and 5 parts by weight of powdered sodium chloride. I then mix this just given formula for a suitable length of time such as, for example, three minutes, more or less. I then remove the mix from the mixer and run the mix into panel form by any suitable means, as for example, between spaced rollers, said mix being run between suitable sheet-form liners such as paperboard, sheet asbestos, sheet metal, etc., and then place the formed panels between spaced hot plates and intumesce the mix.

I may use more or less water soluble salt than the amount specified in the example hereinabove given, less salt producing a less viscous mix and more salt producing a more viscous mix. But, I have found that, based upon the weight of the sodium silicate solution used in the mixer, less than $\frac{1}{20}$ of one per cent by weight of salt, or more than 20 per cent by weight of salt does not produce commercially satisfactory products, the smaller proportion of salt just mentioned being inadequate to properly increase the viscosity of the mix, and the larger proportion of salt just mentioned producing too dry, hard and crumbly a mix to subsequently intumesce properly. Similarly, I may use aqueous silicate of soda solutions, possessing specific gravities greater or lesser than that specified in the hereinabove given example of the present invention and, also, I may use aqueous sodium silicate solutions possessing ratios between their contained silicon dioxide and sodium oxide different from that specified in the hereinabove given example for carrying out the present invention. In general, however, it is best to use as thick sodium silicate solutions as are commonly and practicably produced and containing as little water as possible, said water content only adding to the freight charge of the silicate of soda solutions, and, also, the higher the water content of the silicate soda solution the greater is the amount of heat required for its expulsion from the mix during the intumescing process. Also, I may use, to raise the viscosity of the hereinabove described intumescible mix, instead of the specified sodium chloride, such salts of the alkali metal group as sodium sulfate, potassium chloride, etc., said salts being necessarily and obviously of the class compatible with silicate of soda which tend to salt out the sodium silicate from the water in which it is dissolved. Finally, without in any way departing from the scope of the present invention, I may make the hereinabove described intumescible mix of aqueous sodium silicate solution, a particulate filler material which is either non-reactive or very slowly reactive with sodium silicate and a solid salt, or mixtures of salts, which are compatible with sodium silicate and then, before the mix shall have attained its maximum viscosity in the mixer, remove the said mix from the mixer, run the said mix into panel form between liners, as above described, such liners being sheets of paper board, asbestos, metal, etc., and then allow the formed panels to set quietly for some time, e. g., 30 minutes or less, before intumescing the said panels between spaced, hot plates as heretofore referred to.

In this manner the strain upon the feed rolls is greatly reduced, springing or distortion of said rolls being minimized, resulting in a feed of uniform thickness of the intumescible core. Moreover, upon standing in panel form as hereinabove described, the action of the solid salt as it slowly dissolves progressively engenders a tremendously high viscosity in the core mix which results in a high degree of fineness of the core pore structure of the intumesced core thereby imparting to the said intumesced core more uniformity in strength together with a higher heat insulating value.

In this just described manner, I also avoid putting an undue strain upon the mixer, viz., by allowing the viscosity of the intumescible mix to increase after it has been put into panel form between liners.

My process is to be distinguished from the rather casual use of salt in the form of brine in attempts that have been made to increase the viscosity of sodium silicate generally because brine is not only useless in my invention but deleterious to the point of ruin. As a matter of fact, the brine method does not actually even raise the viscosity of silicate of soda but, in truth, produces instead a sludge that is only confused with a true rise in the viscosity thereof.

The Weiss method first above referred to is to mix a viscous silicate of soda solution with dry pulverized limestone to make what may be called a "putty." To accomplish this, there has to be water for the silicate solution and water to be absorbed by the dry limestone. If salt is added to this in the form of brine, too much water for the desired increase in viscosity becomes thereby present and a sludgy mass evolves that clogs the feeding hopper and springs the feed rolls of the board forming machine in addition to probably breaking the mixing blades that cannot cope with such an immediately thickened mass. This is because a salt solution or brine added to the mix in the mixer reacts at once on the silicate. The addition of the dry salt of my invention, on the other hand, engenders a slow viscosity-raising reaction. It is to be borne in mind that the so-called increased viscosity due to the use of brine, if used in the Weiss manufacture, asserts itself immediately in the mixer and in the feed rolls or the equivalent thereof.

My process is restricted to the use of a salt or salts having cations from the alkali metal group and anions from strong mineral acids, e. g., sodium chloride, sodium sulphate, potassium chloride, etc.

In the prior art, the use of solid sodium tetraborate has been suggested for use in making porous core wallboard to impart to said core a finer pore structure. However, solid sodium tetraborate does not have adequate salting-out action to produce more than a slight jellying effect upon silicate of soda solution when mixtures of sodium tetraborate and sodium silicate solution are made. Furthermore, the jellying effect which solid sodium tetraborate has upon sodium silicate solution is more the effect of abstracting water from the said silicate of soda solution by the sodium tetraborate than a true salting-out action by the sodium tetraborate upon the silicate of soda.

In the present invention, a true salting-out action upon low viscosity silicate of soda solution is necessary in order to get an adequate, sufficiently rapid and economical rise in the viscosity of the said silicate of soda solution so as to permit of making the intumescent core in proper form. In no case can solid sodium tetraborate be used with low viscosity silicate of soda solution to secure a sufficient degree of stiffness or viscosity in the mix used to form the board core in the present invention because, as above stated, solid sodium tetraborate has virtually no true salting-out effect upon silicate of soda solution.

Hence, the successful carrying out of this invention requires the use of solid salts which are compatible with silicate of soda solution and which exert a powerful, true salting-out effect when mixed with said silicate of soda solution.

I claim as my invention:

1. A process for producing an intumesced composition of matter by the application of external heat comprising mixing a particulate filler material, which is not reactive with sodium silicate, with an aqueous sodium silicate solution and a solid water-soluble salt of the alkali metal group which is compatible with sodium silicate and which salts out the silicate of soda from the water in which it is dissolved and also progressively increases the viscosity of the sodium silicate through delayed action after mixing, said salt being composed of a cation from the alkali group of metals and an anion from a strong mineral acid, putting said mix into panel form between sheet-form liners, causing said salt to thereafter raise the viscosity of said mix and intumescing the said mix between spaced, hot plates only after a substantial increase in said viscosity has been reached.

2. A process for producing an intumesced composition of matter by the application of external heat comprising mixing a particulate filler material, which is not reactive with sodium silicate, with an aqueous sodium silicate solution and a solid sodium chloride, putting said mix into panel form between sheet-form liners, causing said sodium chloride to thereafter raise the viscosity of said mix and intumescing the said mix between spaced, hot plates only after a substantial increase in said viscosity has been reached.

HUGH M. SPENCER.